United States Patent
Murakami

(10) Patent No.: US 7,874,582 B2
(45) Date of Patent: Jan. 25, 2011

(54) CHILD SEAT INSTALLATION STRUCTURE WITH SEAT BELT HAVING EXPANDABLE PORTION

(75) Inventor: Yoshiki Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 240 days.

(21) Appl. No.: 12/139,668

(22) Filed: Jun. 16, 2008

(65) Prior Publication Data

US 2009/0066064 A1 Mar. 12, 2009

(30) Foreign Application Priority Data

Sep. 10, 2007 (JP) ................... 2007-234255

(51) Int. Cl.
*B60R 21/18* (2006.01)
(52) U.S. Cl. .................... 280/733; 280/728.2
(58) Field of Classification Search ............ 280/733, 280/728.1, 728.2, 730.1; 180/268
See application file for complete search history.

(56) References Cited

U.S. PATENT DOCUMENTS

| | | | | |
|---|---|---|---|---|
| 5,354,096 A | * | 10/1994 | Tanaka et al. | 280/733 |
| RE36,587 E | * | 2/2000 | Tanaka et al. | 280/733 |
| 6,325,412 B1 | * | 12/2001 | Pan | 280/733 |
| 6,419,263 B1 | * | 7/2002 | Busgen et al. | 280/733 |
| 6,443,487 B1 | * | 9/2002 | Suyama | 280/733 |
| 6,460,881 B1 | * | 10/2002 | Adomeit | 280/733 |
| 6,615,461 B2 | * | 9/2003 | Suyama | 24/633 |
| 6,692,020 B2 | * | 2/2004 | Decomps et al. | 280/733 |
| 6,890,000 B2 | * | 5/2005 | Taubenberger et al. | 280/733 |
| 7,237,800 B2 | * | 7/2007 | Itoga | 280/733 |
| 7,377,544 B2 | * | 5/2008 | Itoga | 280/733 |
| 7,398,995 B2 | * | 7/2008 | Kokeguchi | 280/733 |
| 7,481,452 B2 | * | 1/2009 | Itoga et al. | 280/733 |
| 7,584,991 B2 | * | 9/2009 | Itoga et al. | 280/733 |
| 7,607,687 B2 | * | 10/2009 | Clute et al. | 280/733 |
| 2009/0160167 A1 | * | 6/2009 | Itoga | 280/733 |
| 2009/0160168 A1 | * | 6/2009 | Itoga | 280/733 |

FOREIGN PATENT DOCUMENTS

| | | |
|---|---|---|
| JP | 2001-106007 A | 4/2001 |
| JP | 2001-114052 A | 4/2001 |
| JP | 2001-347860 A | 12/2001 |
| JP | 2005-239055 A | 9/2005 |

* cited by examiner

*Primary Examiner*—Paul N Dickson
*Assistant Examiner*—Timothy D Wilhelm
(74) *Attorney, Agent, or Firm*—Fitch, Even, Tabin & Flannery

(57) ABSTRACT

A child seat installation structure is disclosed in which it is prevented that an expandable portion, when it expands, interferes with a child seat. In one form, an airbelt includes a lap bag and a normal belt portion, a tip of which is connected to the lap bag. A bracket for fixing a tip side of the normal belt portion is provided on a lap anchor. A loop portion is formed on the tip side of the normal belt portion using a clip, and the loop portion is inserted into a fixing hole provided in the bracket and is locked with a lock member. After that, a child seat is placed on a seat, and only the normal belt portion is routed over the child seat.

9 Claims, 8 Drawing Sheets

(a)

(b)

(a)

(b)

(a)

(b)

CHILD SEAT INSTALLATION STRUCTURE WITH SEAT BELT HAVING EXPANDABLE PORTION

FIELD OF THE INVENTION

The present invention relates to a child seat installation structure in which a child seat is fixed to a vehicle seat using an airbelt as a seat belt, the airbelt having an expandable portion and a normal belt portion, a tip of which is connected to one end of the expandable portion.

The present invention also relates to a vehicle seat that is provided with an airbelt having an expandable portion and a normal belt portion, a tip of which is connected to one end of the expandable portion, more particularly to a vehicle seat that is suitable for fixing a child seat to the seat using this airbelt.

BACKGROUND OF THE INVENTION

As a structure for installing a child seat to a vehicle seat, it is well known to place a child seat on a vehicle seat and to fix the child seat to the vehicle seat by routing a seat belt of the vehicle seat over the child seat (for example, Japanese Unexamined Patent Application Publication No. 2001-347860).

Also, as a seat belt, an airbelt having an expandable portion, which expands by bringing in a gas from an inflator, is known (for example, Japanese Unexamined Patent Application Publication No. 2005-239055). An airbelt of the above publication includes a normal belt portion (called webbing in the publication), which is fabricated of a non-expandable belt material as with a normal seat belt, and a lap bag that is an expandable portion disposed along the normal belt portion.

One end of the normal belt portion is connected to one of side frames of a vehicle seat using a lap anchor, and the other end side is connected to a seat belt retractor so as to be retractable. A middle portion of the normal belt portion is threaded through a tang, and moreover, the seat belt retractor side with respect to the tang is threaded through a shoulder anchor. This normal belt portion is routed to the front side of the vehicle seat as with a normal seat belt and its tang is connected to a buckle device.

A part of the normal belt portion between the tang and the shoulder anchor constitutes a shoulder portion and a part between the tang and the lap anchor constitutes a lap portion. This lap portion is provided with the above lap bag.

In an emergency case such as a vehicle collision or the like, an inflator is activated to blow a gas, which flows from the inflator into the lap bag and allows the lap bag to expand.

In a vehicle seat that is provided with an airbelt, there is a case that a child seat is fixed to the vehicle seat by routing the airbelt over the child seat as a seat belt. In this case, when an expandable portion of the airbelt expands, there is a fear that the expanded expandable portion interferes with the child seat, which may adversely affect each other.

SUMMARY OF THE INVENTION

An object of the present invention is to provide a child seat installation structure, in which a child seat is fixed to a vehicle seat using an airbelt as a seat belt, the airbelt having an expandable portion and a normal belt portion, a tip of which is connected to one end of the expandable portion, and being connected to a vehicle side member at the other end of the expandable portion, wherein it is prevented that the expandable portion, when it expands, interferes with the child seat.

The child seat installation structure in a first form of the present invention is such a child seat installation structure in which a child seat is fixed to a vehicle seat using an airbelt as a seat belt, the airbelt having an expandable portion and a normal belt portion, a tip of which is connected to one end of the expandable portion, and being connected to a vehicle side member at the other end of the expandable portion, wherein it is characterized that only the normal belt portion is routed over the child seat, and the tip side of the normal belt portion is connected to a vehicle side member without the expandable portion being included.

The child seat installation structure in a second form is characterized in that, in the first form, the tip side of the normal belt portion is connected to the vehicle side member through a connecting member.

The child seat installation structure in a third form is characterized in that, in the second form, the vehicle side member is provided with an anchor for connecting the other end of the expandable portion to the vehicle seat and a bracket for fixing the tip side of the normal belt portion.

The child seat installation structure in a fourth form is characterized in that, in the third form, a loop portion is formed on the tip side of the normal belt portion using a clip, and the loop portion is inserted into a fixing hole provided in the bracket and is locked with a lock member.

The child seat installation structure in a fifth form is characterized in that, in the fourth form, the bracket is connected to the anchor.

The child seat installation structure in a sixth form is characterized in that, in the fifth form, the bracket is connected to the vehicle seat.

In the child seat installation structure of the first form of the present invention, only a normal belt portion of an airbelt is routed over a child seat and a tip side of the normal belt portion is connected to a vehicle member without an expandable portion being included; thereby the child seat is fixed to a vehicle seat by only the normal belt portion. That is, since the expandable portion of the airbelt is not routed over a child seat in the child seat installation structure of the present invention, it is prevented that the expandable portion, when it expands, interferes with the child seat.

In the present invention, the child seat installation structure may be configured, as in the second form, such that the tip side of the normal belt portion is connected to the vehicle side member through a connecting member.

In the present invention, the vehicle side member may be structured, as in the third form, so as to be provided with an anchor for connecting the other end of the expandable portion to the vehicle seat and a bracket for fixing the tip side of the normal belt portion.

In this case, the tip side of the normal belt portion can be easily and securely fixed to the vehicle side member through the connecting member by configuring so that a loop portion is formed on the tip side of the normal belt portion using a clip, and the loop portion is inserted into a fixing hole provided in the bracket and is locked with a lock member, as in the fourth form.

In the present invention, the bracket may be connected to the anchor as in the fifth form, or may be connected to the vehicle seat as in the sixth form.

DETAILED DESCRIPTION OF THE PREFERRED EMBODIMENTS

An embodiment of the present invention will now be described with reference to the attached drawings.

Figure 1:
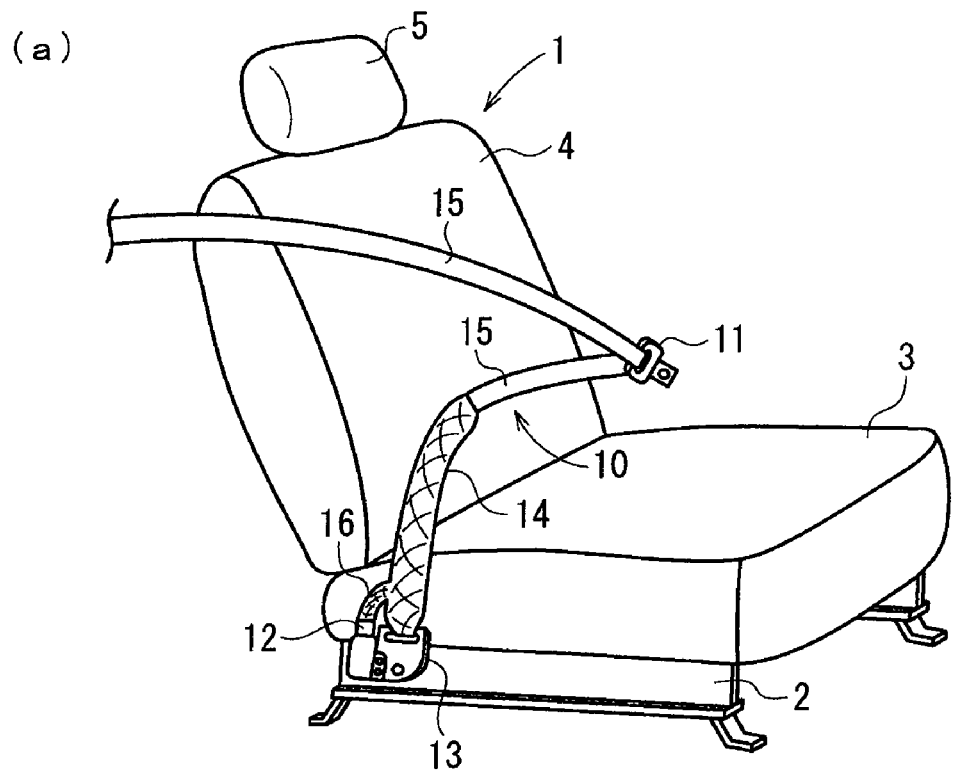
FIGS. 1(a) and 1(b) are perspective views of a vehicle seat having a child seat installation structure according to the embodiment.
Figure 1:
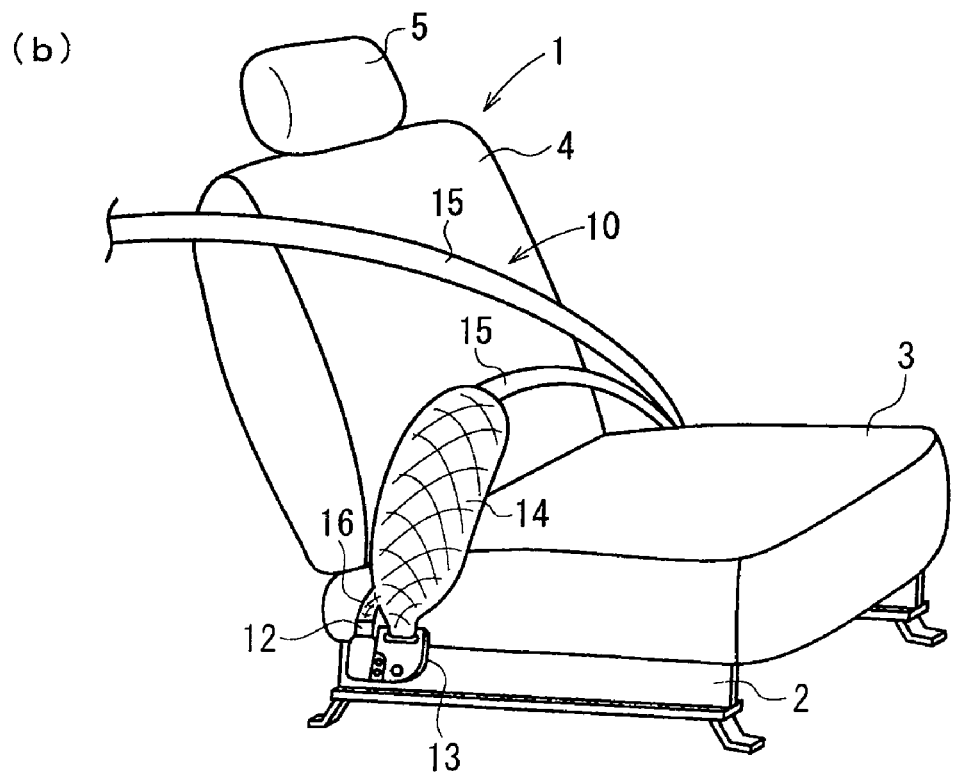
Figure 2:
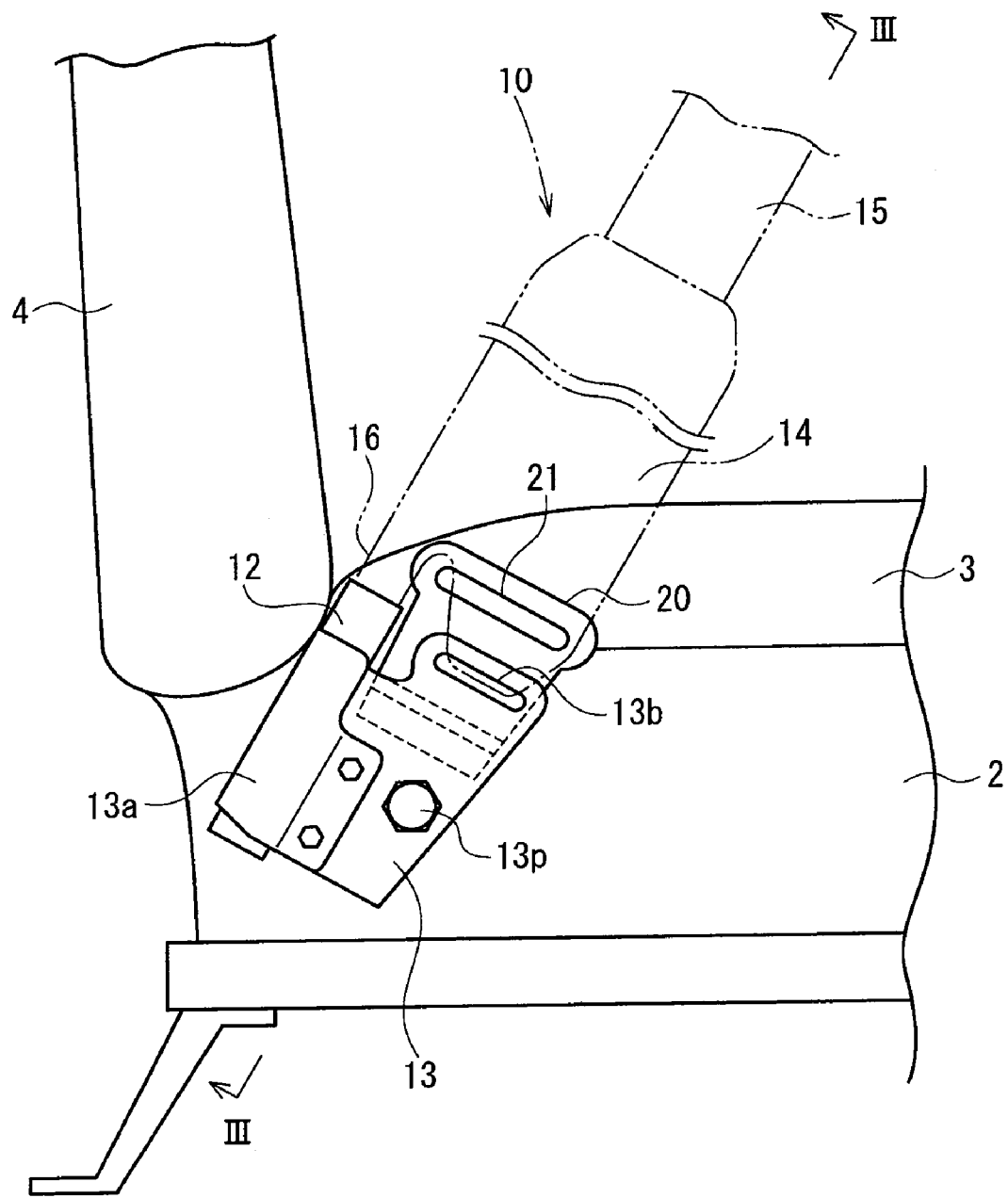
FIG. 2 is an elevation view of the area around a lap anchor of the vehicle seat of FIGS. 1(a) and 1(b).
Figure 3:
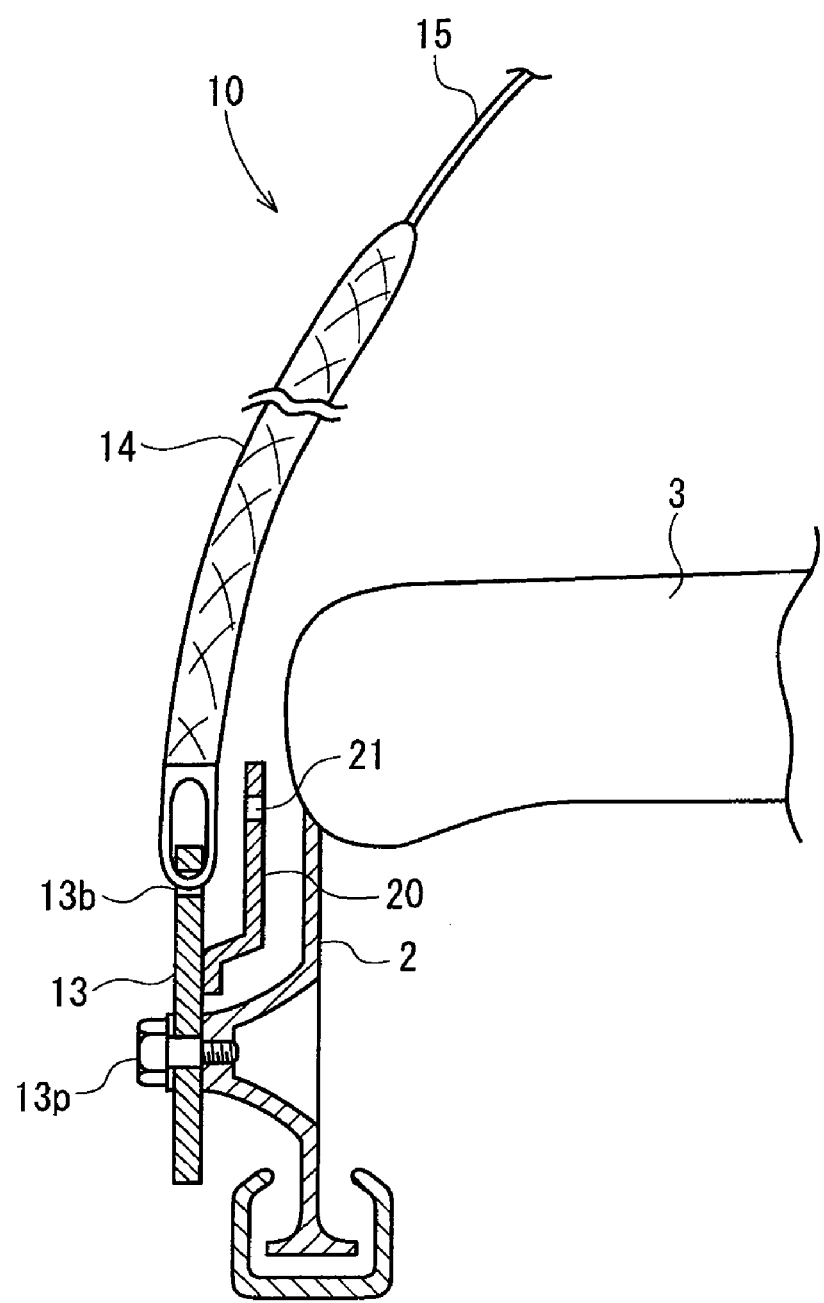
FIG. 3 is a cross-sectional view taken from line III-III of FIG. 2.
Figure 4:
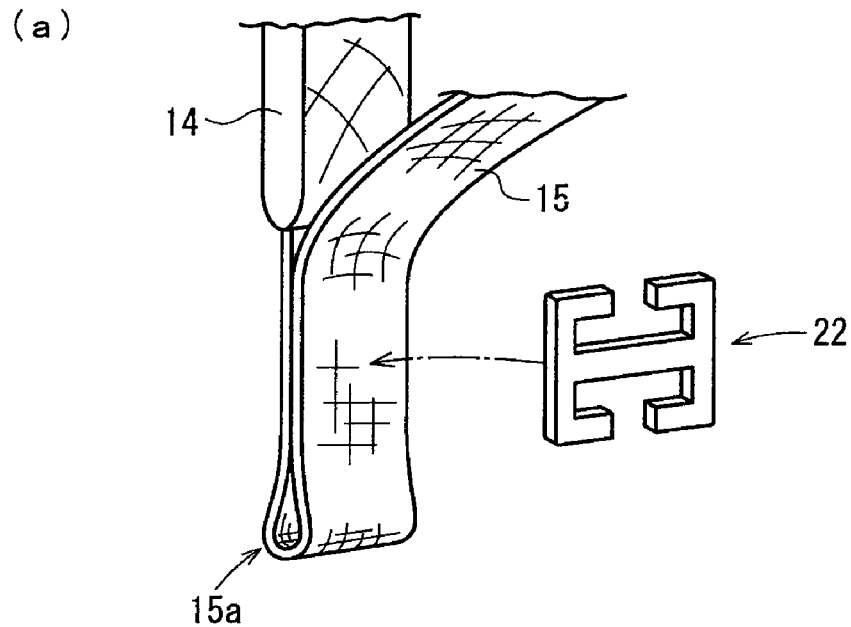
FIGS. 4(a) and 4(b) are perspective views showing a procedure for fixing a tip side of a normal belt portion of an airbelt to a bracket.
Figure 4:
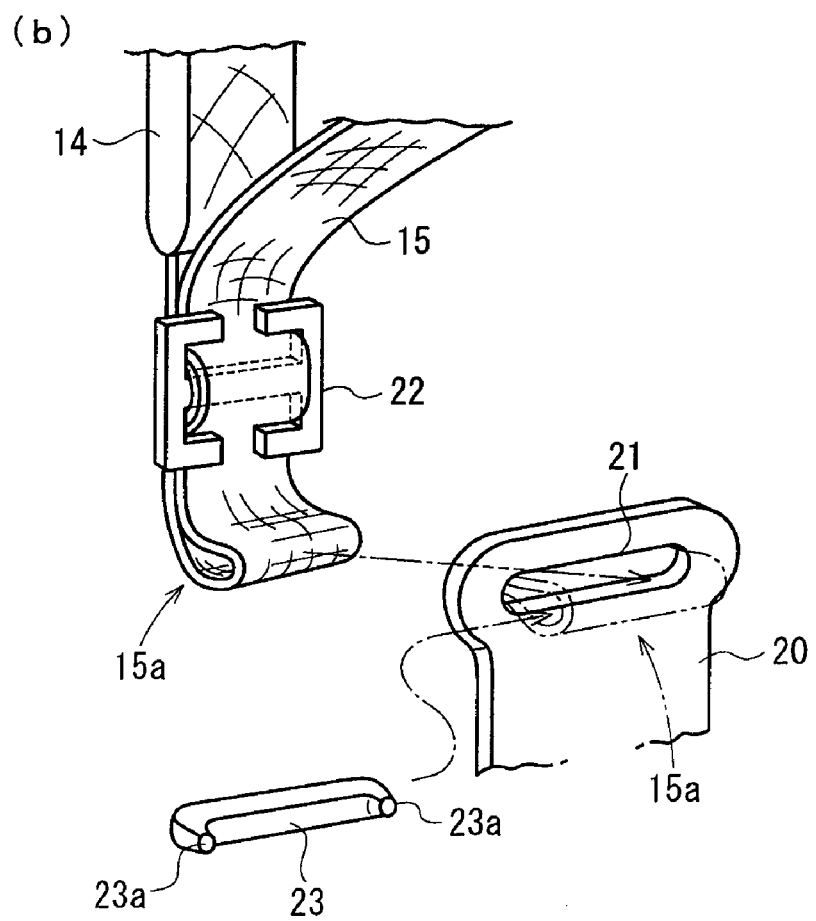
Figure 5:
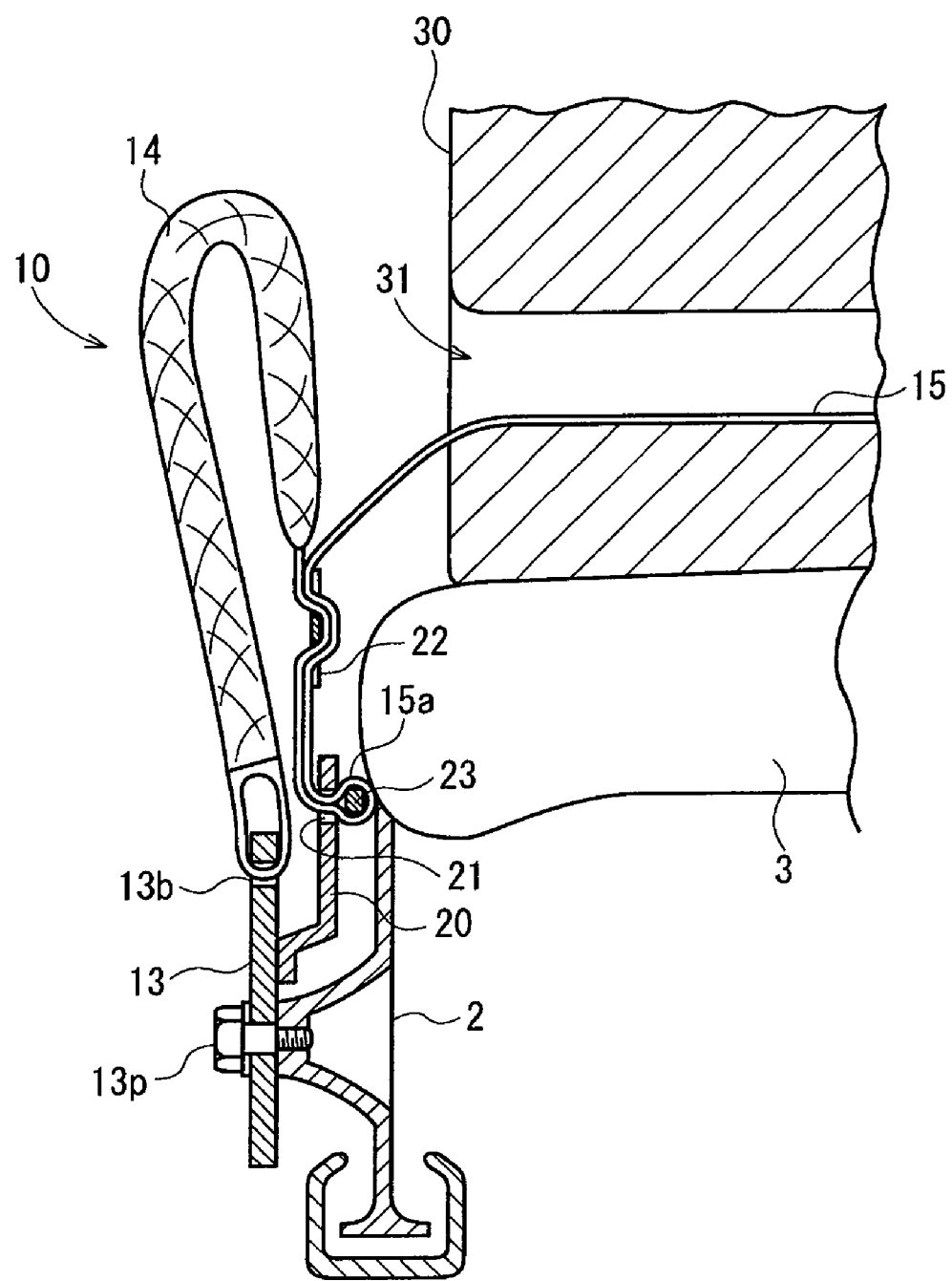
FIG. 5 is a cross-sectional view of the area around the lap anchor after a child seat is fixed to the vehicle seat with the normal belt portion.
Figure 6:
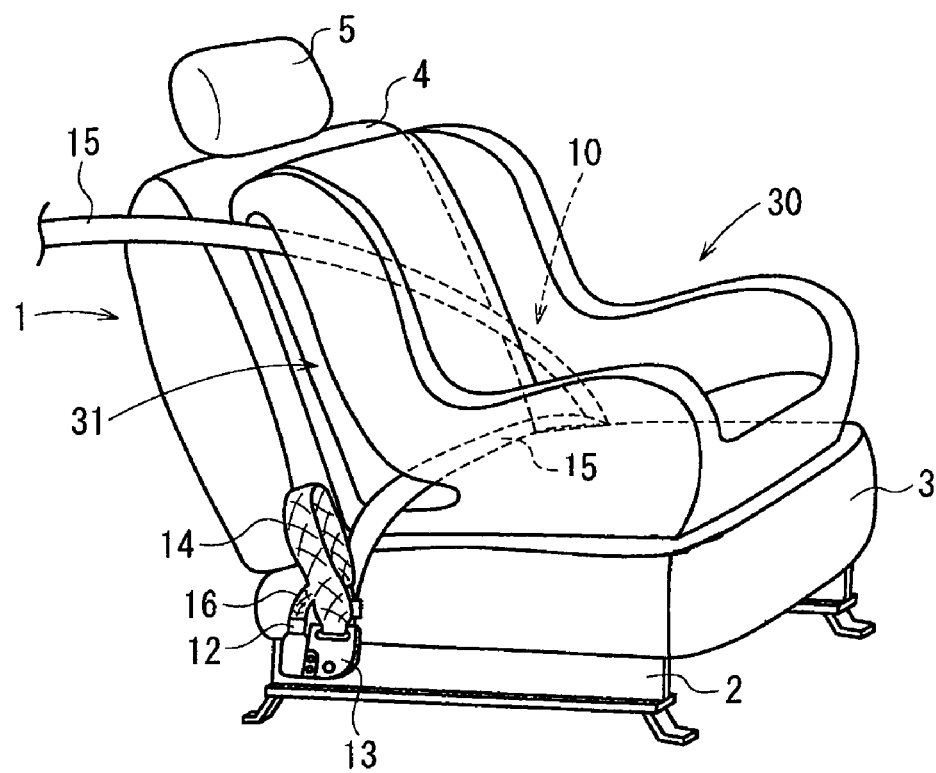
FIGS. 6(a) and 6(b) are perspective views of the vehicle seat after the child seat is installed.
Figure 6:
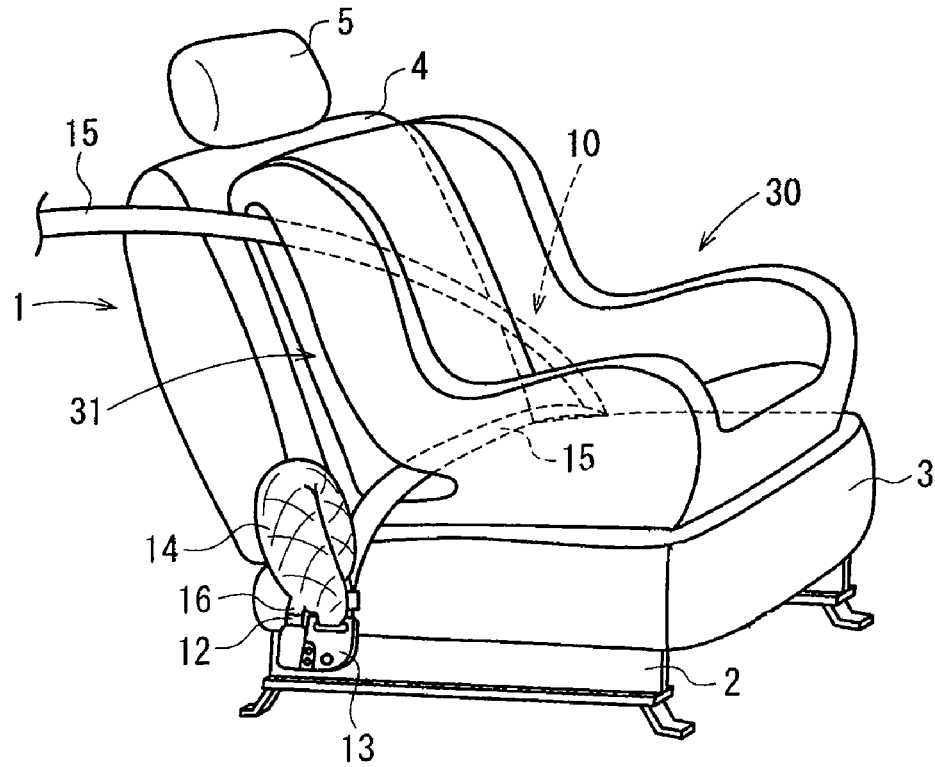
Figure 7:
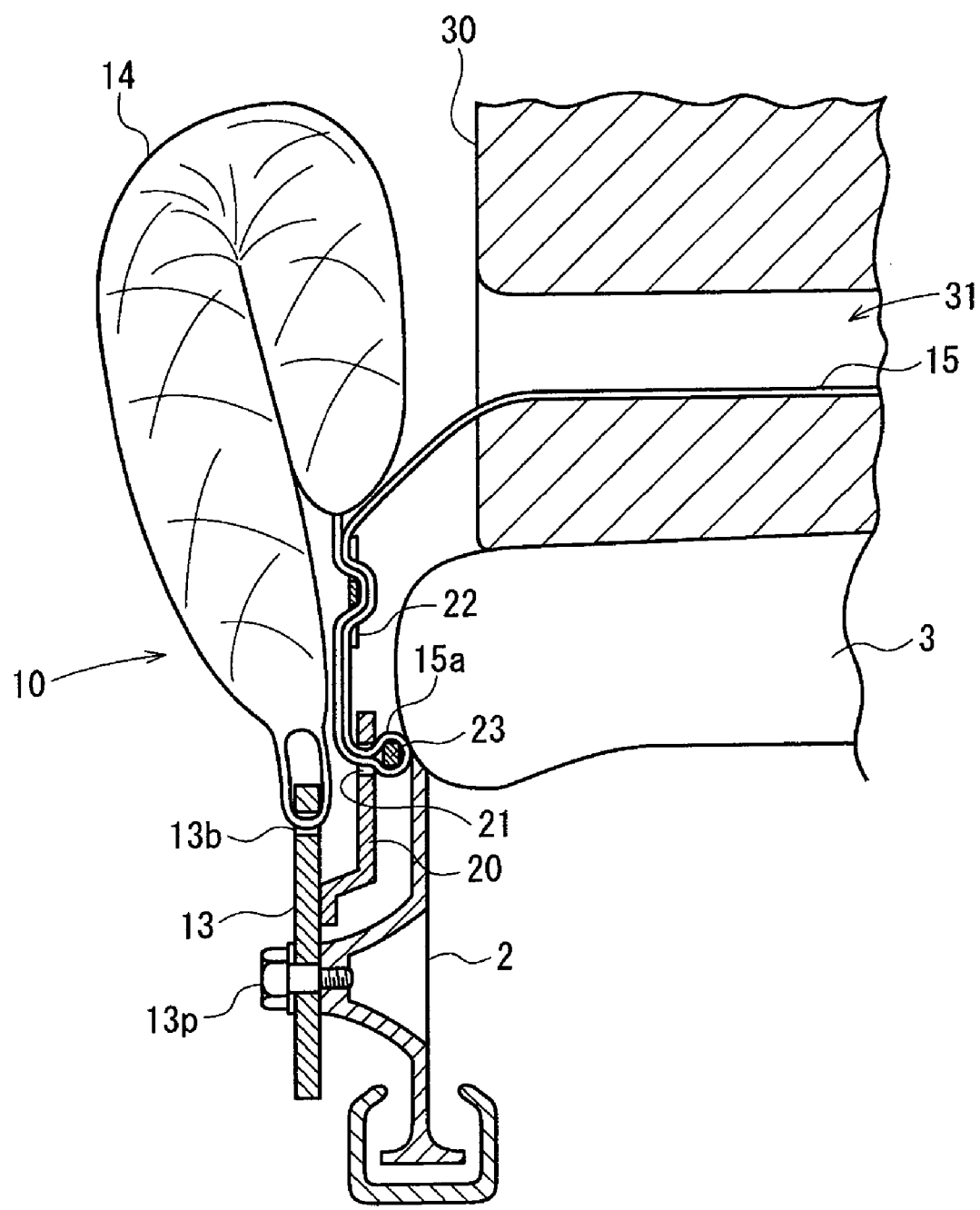
FIG. 7 is a cross-sectional view of the area around the lap anchor when a lap bag, being an expandable portion of the airbelt, expands after the child seat is installed.

FIGS. 1(a), 1(b) are perspective views of a vehicle seat having a child seat installation structure according to the embodiment, FIG. 2 is an elevation view of the area around a lap anchor of this vehicle seat, FIG. 3 is a cross-sectional view taken from line III-III of FIG. 2, FIGS. 4(a), 4(b) are perspective views showing a procedure for fixing a tip side of a normal belt portion of an airbelt to a bracket, FIG. 5 is a cross-sectional view of the area around the lap anchor after a child seat is fixed to the vehicle seat with the normal belt portion, FIGS. 6(a), 6(b) are perspective views of the vehicle seat after the child seat is installed thereon, and FIG. 7 is a cross-sectional view of the area around the lap anchor when a lap bag, being an expandable portion of the airbelt, expands after the child seat is installed.

Incidentally, FIG. 1(a) shows such a state that no child seat is installed to the vehicle seat and the lap bag is not expanded, and FIG. 1(b) shows such a state that the lap bag is expanded in a situation that no child seat is installed to the vehicle seat. FIG. 4(a) shows such a state that a loop portion is being formed on a tip side of the normal belt portion with a clip, and FIG. 4(b) shows such a state that the loop portion formed on the tip side of the normal belt portion is being inserted into a fixing hole of the bracket and is being locked with a lock member. Each of FIG. 5 and FIG. 7 is a cross-sectional view of the area similar to that of FIG. 3 (a cross-sectional view taken from line III-III of FIG. 2). FIG. 6(a) shows such a state that the lap bag is not expanded after a child seat is installed to the vehicle seat, and FIG. 6(b) shows such a state that the lap bag is expanded after a child seat is installed to the vehicle seat.

A vehicle seat (hereafter, sometimes shortened simply to seat) 1 consists of a seat frame 2, a seat cushion 3 mounted on the seat frame 2, a seat back 4 vertically mounted on the rear of the seat cushion 3 so as to be reclinable, and a headrest 5 mounted on the top the seat back 4. An airbelt 10 is routed on the front side of the seat 1. On a side face on the cabin-center side of the seat frame 2, a buckle device (not shown), to which a tang 11 of the airbelt 10 is detachably connected, is installed. Moreover, on a side face on the cabin side face (door portion and the like) side of the seat frame 2, an inflator 12 and a lap anchor 13 are installed.

This lap anchor 13 is attached by a support shaft 13p (FIG. 2) to be freely rotatable in a fore-and-aft direction with respect to the seat frame 2. In this embodiment, the inflator 12 is fixed to this lap anchor 13 by a retaining member 13a (FIG. 2) and is allowed to rotate integrally together with the lap anchor 13.

The airbelt 10 includes a lap bag 14, being an expandable portion, and a normal belt portion 15, a tip of which is connected to one end of the lap bag 14. The normal belt portion 15 is fabricated of a non-expandable belt material as with a normal seat belt. This normal belt portion 15 is threaded through the tang 11. The rear end side of the normal belt portion 15 is connected to a seat belt retractor (not shown) so as to be allowed to be reeled in, after being threaded through a shoulder anchor (not shown), which is provided on a pillar portion or the like of a vehicle body.

Although not shown, the lap bag 14 consists of a bag body and a cylindrically shaped cover, which covers the bag body. The bag body is in a state of being folded into a slim and flat shape in a usual situation. The cover is constituted so as to have a size fit to the periphery of a folded shape of the bag body when the bag body is in a state of being not expanded, and so as to allow the bag body to expand by being extended in a circumferential direction when the bag body is expanded.

One end of the cover is connected to the normal belt portion 15 by means of sewing or the like. The other end of the cover is threaded through an opening 13b (FIG. 2) provided in the lap anchor 13, and is connected to the lap anchor 13.

Incidentally, in this embodiment, the cover is composed of a fabric that extends freely in a circumferential direction but little in a longitudinal direction. On that account, when the bag body expands, the mesh of the cover becomes widened in a circumferential direction as the cover extends in the circumferential direction; as a result, the length of the cover in a longitudinal direction becomes shortened. Consequently, the normal belt portion 15 is tightened and becomes contacted tightly to the body of an occupant.

A substantially cylindrically shaped gas guide-in port 16 extends from the bag body. The gas guide-in port 16 is drawn out to the outside of the cover from the vicinity of an end portion of the cover on the side of the lap anchor 13, and is connected to a gas blow-out port (not shown) of the inflator 12. The gas guide-in port 16 is, for example, fitted onto the gas blow-out port of the inflator 12 and is connected to the inflator 12 by being fastened from therearound with a band (not shown).

In this embodiment, the lap anchor 13 is provided with a bracket 20 for retaining a tip side of the normal belt portion 15 of the airbelt 10.

In this embodiment, the bracket 20 is constituted of a substantially rectangularly shaped metal plate and is disposed on the lap anchor 13 on the side of the seat 1 so that its longitudinal direction is an up-and-down direction, and its lower end side is connected to the lap anchor 13 by welding or the like. Incidentally, as shown in FIG. 5, the lower end side of the bracket 20 is bent into a crank-like shape, and its upper end side is spaced from the lap anchor 13 toward the seat 1. Moreover, the upper end side of the bracket 20 extends upward further than an upper end of the lap anchor 13.

As shown in FIG. 2, a fixing hole 21, into which the tip side of the normal belt portion 15 is inserted, is provided on the upper end side of the bracket 20. This fixing hole 21 is formed into a horizontally long slit-like shape, and has a width and extended length that allow the normal belt portion 15 in a state of being folded into two to be insertable. This fixing hole 21 is exposed above the lap anchor 13

In the case when the tip side of the normal belt portion 15 is fixed to the bracket 20, the tip side of the normal belt portion 15 is first folded into two at a position slightly apart from a portion connected with the lap bag 14, as shown in FIG. 4(*a*). Then, a loop portion 15*a* is formed on the tip side of the normal belt portion 15 by pinching overlapping parts of the normal belt portion 15 together using a clip 22. It is noted that although an H-shaped clip is used as the clip 22 in this embodiment, clips of other shapes such as spiral shape, pinch shape or the like may be used.

In the next place, the tip side of the normal belt portion 15 is pulled down to a lateral side of the seat 1 (lap anchor 13 side) as the lap bag 14 folded as shown in FIG. 5 is pushed away to the lateral side of the seat 1, and the loop portion 15*a* is inserted into the fixing hole 21 of the bracket 20 as shown in FIG. 4(*b*). Then, the loop portion 15*a* is fixed to the bracket 20 by inserting a stick-like lock member 23 into the loop portion 15*a* that has been passed through the fixing hole 21 and projected to the other side of the bracket 20.

Incidentally, the length of the lock member 23 is longer than the width of the normal belt portion 15 and the extended length of the fixing hole 21. In addition, on both end sides of the lock member 23, there are each formed a lug 23*a* that juts out toward a longitudinal direction and intersecting direction of the lock member 23, and the lock member 23 is prevented by the lugs 23*a*, which are engaged with the normal belt portion 15 at both side edges thereof, from being come off.

In a manner that the tip side of the normal belt portion 15 is thus fixed to the bracket 20, the tip side of the normal belt portion 15 is connected direct-wise to the seat 1 without the lap bag 14 being included.

In a child seat 30, there is provided a belt-threading hole 31 that passes through the child seat 30 in a left-and-right direction. In this embodiment, the belt-threading hole 31 extends along a backrest portion (not denoted by a reference numeral) of the child seat 30 in an up-and-down direction as shown in FIG. 6, and its lower end side extends forward along a seating portion (not denoted by a reference numeral) of the child seat 30.

The child seat 30 is placed on the seat 1 after the tip side of the normal belt portion 15 is fixed to the bracket 20 as shown in FIG. 6(*a*), the airbelt 10 (normal belt portion 15) is then threaded through the belt-threading hole 31 so that the tang 11 passes first therethrough, and the tang 11 is connected to the buckle device. At this time, since the tip side of the normal belt portion 15 is connected to the seat 1 without the lap bag 14 being included, only the normal belt portion 15 of the airbelt 10 is routed over the child seat 30, and the child seat 30 is fixed to the seat 1 only by the normal belt portion 15.

It is noted that the installation procedure for the child seat 30 is not limited to this, but, for example, the child seat 30 may be placed on the seat 1, and the tip side of the normal belt portion 15 may be fixed to the bracket 20 after the normal belt portion 15 of the airbelt 10 is routed over the child seat 30.

When a collision of the vehicle is detected, the inflator 12 is activated to blow out a gas. The gas from the inflator 12 flows into the lap bag 14 and allows the lap bag 14 to expand.

In this child seat installation structure, since only the normal belt portion 15 of the airbelt 10 is routed over the child seat 30 and the lap bag 14 is not routed over the child seat 30, as shown in FIG. 6(*b*) and FIG. 7, even in the case when the lap bag 14 expands, it is prevented that the expanded lap bag 14 interferes with the child seat 30.

In this embodiment, since being configured in such a way that the bracket 20 for fixing the tip side of the normal belt portion 15 is provided on the lap anchor 13, the loop portion 15*a* is formed on the tip side of the normal belt portion 15 using the clip 22, and this loop portion 15*a* is inserted into the fixing hole 21 provided in the bracket 20 and is locked with the lock member 23, the tip side of the normal belt portion 15 can be easily and securely fixed to the seat 1 through the bracket 20.

Incidentally, in the case that the child seat 30 is not installed on the seat 1 but an occupant is seated, the airbelt 10 is used as with a normal seat belt in a state that the tip side of the normal belt portion 15 is not fixed to the bracket 20, as shown in FIG. 1(*a*).

In this occasion, when a collision of the vehicle is detected and the inflator 12 is activated to blow out a gas, the lap bag 14 expands along a waist portion of the occupant by dint of the gas from the inflator 12, as shown in FIG. 1(*b*). Because the lap bag 14 becomes shortened when expands, a pretension arises in a lap portion of the airbelt 10 (normal belt portion 15) and causes the waist portion of the occupant to be restrained to the seat. In addition, an impact applied to the waist portion of the occupant is absorbed by the expanded lap bag 14. Incidentally, the expanded lap bag 14 existing between a cabin side wall (door portion or the like) and the occupant restrains the occupant's waist portion from being moved toward the cabin side wall. Furthermore, this lap bag 14 also becomes a cushion member in the case when the cabin side wall breaks in the occupant side.

The embodiment described above is all an example of the present invention, and the present invention is not limited to each of the embodiment described above.

Figure 8:
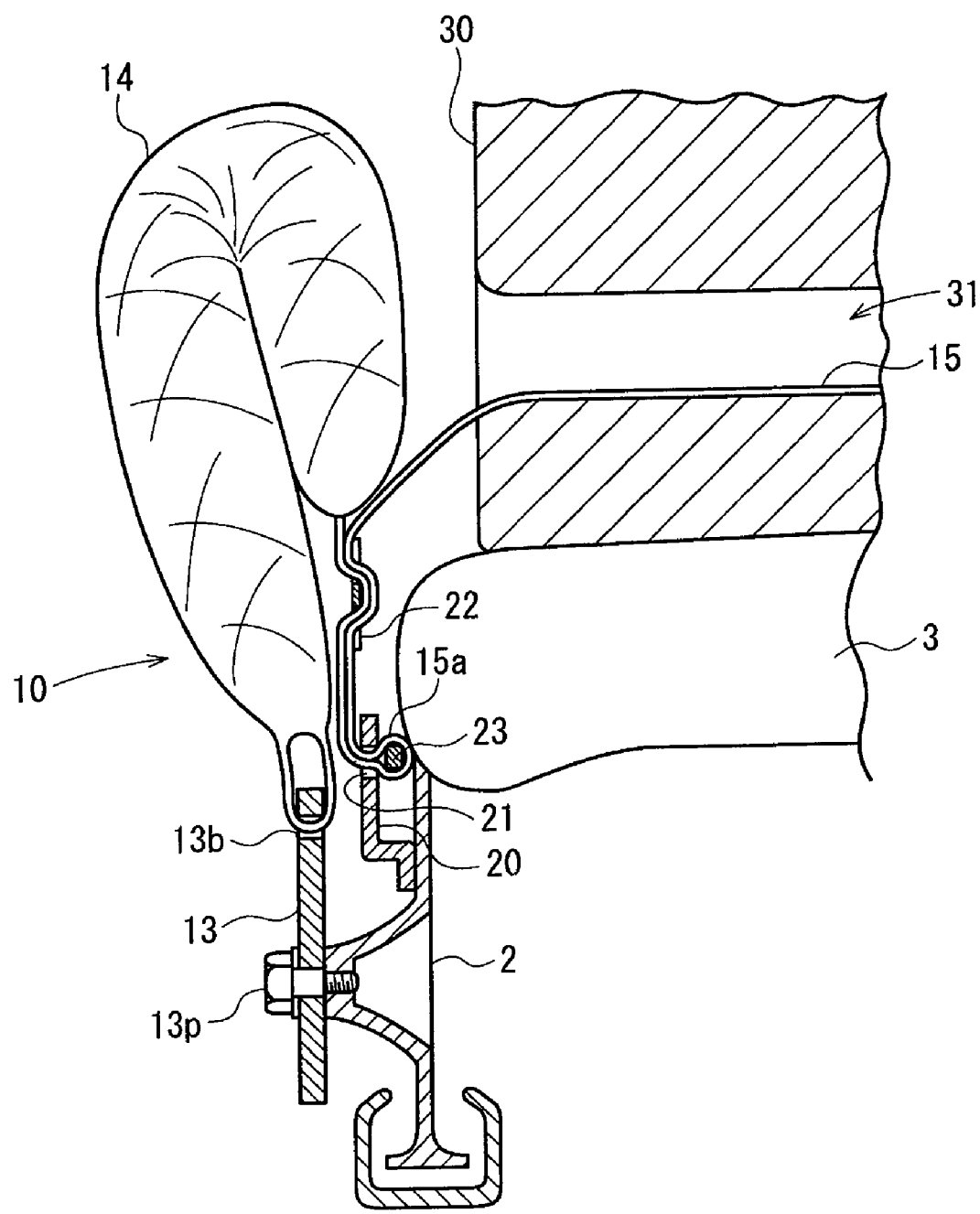
FIG. 8 is a cross-sectional view in the case that a bracket for fixing the tip side of the normal belt portion is connected to the vehicle seat.

For example, although the bracket 20 for fixing the tip side of the normal belt portion 15 is provided on the lap anchor 13 in the embodiment described above, the bracket 20 may be provided on the vehicle seat 1 in isolation from the lap anchor 13 as shown in FIG. 8. Incidentally, in the embodiment of FIG. 8, the bracket 20 is disposed to be adjacent to the lap anchor 13 and is connected to a surface of the seat frame 2 of the seat 1 on the side of a cabin side face (door portion or the like) in isolation from the lap anchor 13. However, the disposition of the bracket 20 is not limited to this. Likewise, the bracket 20 may be mounted to a vehicle body side member other than the vehicle seat 1.

The structure for fixing the tip side of the normal belt portion 15 to the vehicle body side member is not limited to the configuration shown in the attached drawings.

Although an end of the normal belt portion 15 is connected to one end of the lap bag 14 in the embodiment described above, the airbelt of the present invention may be configured, as with the airbelt of Japanese Unexamined Patent Application Publication No. 2005-239055 described above, so that the normal belt portion 15 extends to the lap anchor 13 and the lap bag 14, being an expandable portion, is attached in a middle portion of this normal belt portion 15. In this case, the connecting portion where the normal belt portion 15 is connected to an end of the lap bag 14 on the side opposite to the lap anchor 13 becomes the tip of the normal belt portion 15 in the present invention.

What is claimed is:

1. An inflatable seat belt system for use with either an occupant or a child seat on a vehicle seat, the inflatable seat belt system comprising:

a seat belt having inflatable and non-inflatable portions;

a first inflated mode of the seat belt with the inflatable portion of the seat belt inflated and applying tension to the non-inflatable portion of the seat belt for securing the occupant on the vehicle seat during vehicle collisions; and a second inflated mode of the seat belt with the inflatable portion of the seat belt inflated and not applying tension to the non-inflatable portion of the seat belt for securing the child seat on the vehicle seat with the seat belt non-inflatable portion during vehicle collisions.

2. The inflatable seat belt system of claim 1 wherein in the first inflated mode the inflatable and non-inflatable portions extend continuously across the occupant, and for the second inflated mode the inflatable portion is stowed along one side of the vehicle seat prior to inflation of the inflatable portion.

3. The inflatable seat belt system of claim 2 wherein in the second inflated mode the inflatable portion of the seat belt is folded back against itself.

4. The inflatable seat belt system of claim 1 wherein the inflatable portion of the seat belt includes one end anchored at one side of the vehicle seat and an opposite end connected to the non-inflatable portion of the seat belt, in the first inflated mode tension is applied to the non-inflatable portion by the opposite end of the inflatable portion, and in the second inflated mode the opposite end of the inflated inflatable portion is anchored so that the anchored opposite end does not apply tension to the non-inflatable portion.

5. The inflatable seat belt system of claim 4 wherein a portion of the non-inflatable portion adjacent the opposite end of the inflatable portion is directly connected to an anchor along the one side of the vehicle seat to thereby anchor the inflatable portion opposite end thereto in the second inflated mode.

6. The inflatable seat belt system of claim 1 wherein the inflatable portion of the seat belt is constructed of material so that upon inflation, the inflatable portion is shortened in a longitudinal direction to exert tension on the non-inflatable portion.

7. An inflatable seat belt system for use with an occupant or child seat on a seat of a vehicle, the inflatable seat belt system comprising:
 a seat belt for restraining an occupant on the vehicle seat or for holding a child seat on the vehicle seat;
 an inflatable belt portion of the seat belt;
 a non-inflatable belt portion of the seat belt;
 a belt connection between the inflatable belt portion and the non-inflatable belt portion constructed so that inflation of the inflatable belt portion generates tension in the non-inflatable belt portion for restraining the occupant on the vehicle seat;
 an anchor connection device configured to anchor a portion of the non-inflatable belt portion adjacent the belt connection to the vehicle to allow only the non-inflatable belt portion to be used to hold the child seat on the vehicle seat so that inflation of the inflatable belt portion does not interfere therewith, wherein the anchor connection device comprises a connecting member having a slot opening, and the portion of the non-inflatable belt portion comprises a loop portion that is formed in the seat belt non-inflatable belt portion for being inserted through the slot opening, and
 a lock member for being inserted through the loop portion and sized so that the loop portion is connected to the connecting member to allow only the non-inflatable belt portion to be used to hold the child seat on the vehicle seat.

8. The inflatable seat belt system of claim 7 including a clip configured to fit on the non-inflatable belt portion for forming the loop portion.

9. An inflatable seat belt system for use with an occupant or child seat on a seat of a vehicle, the inflatable seat belt system comprising:
 a seat belt for restraining an occupant on the vehicle seat or for holding a child seat on the vehicle seat;
 an inflatable belt portion of the seat belt;
 a non-inflatable belt portion of the seat belt;
 a belt connection between the inflatable belt portion and the non-inflatable belt portion constructed so that inflation of the inflatable belt portion generates tension in the non-inflatable belt portion for restraining the occupant on the vehide seat; and
 an anchor connection device configured to anchor a portion of the non-inflatable belt portion adjacent the belt connection to the vehicle to allow only the non-inflatable belt portion to be used to hold the child seat on the vehicle seat so that inflation of the inflatable belt portion does not interfere therewith, wherein the anchor connection device comprises an anchor assembly for being rotatably affixed to one side of the vehicle seat to anchor the portion of the non-inflatable belt portion to the vehicle, and wherein the anchor assembly includes a first connection location for one end of the inflatable belt portion and a second connection location for the portion of the non-inflatable belt portion with the second connection being above the first connection location and laterally closer to the one side of the vehicle seat than the first connection location.

* * * * *

UNITED STATES PATENT AND TRADEMARK OFFICE
CERTIFICATE OF CORRECTION

PATENT NO. : 7,874,582 B2
APPLICATION NO. : 12/139668
DATED : January 25, 2011
INVENTOR(S) : Yoshiki Murakami It is certified that error appears in the above-identified patent and that said Letters Patent is hereby corrected as shown below:

In the Claims

Claim 9, Column 8, Line 28, delete "vehide" and insert -- vehicle --.

Signed and Sealed this
Third Day of May, 2011

David J. Kappos
*Director of the United States Patent and Trademark Office*